United States Patent
Adachi et al.

(10) Patent No.: US 8,129,501 B2
(45) Date of Patent: Mar. 6, 2012

(54) DISPERSION IMPROVER FOR GLUTEN, AND DISPERSION SOLUTION OF GLUTEN (75) Inventors: Norifumi Adachi, Tsukubamirai (JP); Hiroko Yano, Izumisano (JP); Yugo Shima, Tsukubamirai (JP); Hitoshi Furuta, Tokyo (JP)

(73) Assignee: Fuji Oil Company, Limited, Osaka (JP)

( * ) Notice: Subject to any disclaimer, the term of this patent is extended or adjusted under 35 U.S.C. 154(b) by 37 days.

(21) Appl. No.: 12/452,528

(22) PCT Filed: Jul. 9, 2008

(86) PCT No.: PCT/JP2008/062372
§ 371 (c)(1),
(2), (4) Date: Jan. 7, 2010

(87) PCT Pub. No.: WO2009/011253
PCT Pub. Date: Jan. 22, 2009

(65) Prior Publication Data
US 2010/0145019 A1 Jun. 10, 2010

(30) Foreign Application Priority Data

Jul. 13, 2007 (JP) ................................. 2007-184328
Jul. 13, 2007 (JP) ................................. 2007-184632
Dec. 7, 2007 (JP) ................................. 2007-316798
Mar. 19, 2008 (JP) ................................. 2008-070718

(51) Int. Cl.
*C07K 14/415* (2006.01)
*C08B 37/06* (2006.01)
(52) U.S. Cl. .......................................... 530/374; 536/2
(58) Field of Classification Search ................... 530/374; 536/2
See application file for complete search history.

(56) References Cited

U.S. PATENT DOCUMENTS 5,738,805 A 4/1998 Chaundy et al.
6,833,151 B2 * 12/2004 Takahashi et al. ............ 426/577
2002/0165125 A1 11/2002 Merrill et al.
2004/0254109 A1 12/2004 Merrill et al.
2005/0013900 A1 * 1/2005 Dohl et al. ...................... 426/35

FOREIGN PATENT DOCUMENTS

| CA | 1100489 | 5/1981 |
| CA | 2167662 | 1/1996 |
| EP | 1 224 869 | 7/2002 |
| JP | 46-24063 | 7/1971 |
| JP | 51-128447 | 11/1976 |
| JP | 4-121161 | 4/1992 |
| JP | 10-295281 | 11/1998 |
| JP | 2002-223737 | 8/2002 |
| JP | 2002-238463 | 8/2002 |
| JP | 2003-284517 | 10/2003 |
| JP | 2007-54019 | 3/2007 |

OTHER PUBLICATIONS

International Search Report issued Sep. 16, 2008 in International (PCT) Application No. PCT/JP2008/062372.
P.D. Ribotta et al., "Interactions of Hydrocolloids and Sonicated-Gluten Proteins", Food Hydrocolloids, vol. 19, pp. 93-99, 2005.

* cited by examiner

*Primary Examiner* — Chih-Min Kam
(74) *Attorney, Agent, or Firm* — Wenderoth, Lind & Ponack, L.L.P.

(57) ABSTRACT

Disclosed is gluten having good dispersibility in water. Also disclosed is a method for producing active gluten, a gluten-containing food or a gluten gel efficiently by using a gluten dispersion solution. Further disclosed is a method for producing a gluten hydrolysate efficiently by preparing a gluten dispersion solution in a simple manner and hydrolyzing the dispersion solution. Gluten, which normally forms an aggregate in water, can be dispersed readily by mixing gluten with a water-soluble polysaccharide containing galacturonic acid. The gluten dispersion solution thus prepared can be used to produce active gluten, a gluten-containing food or a gluten gel efficiently, and can be also used to prepare a gluten hydrolysate in a simple manner, efficiently and stably.

4 Claims, 2 Drawing Sheets

DISPERSION IMPROVER FOR GLUTEN, AND DISPERSION SOLUTION OF GLUTEN

This application is a U.S. national stage of International Application No. PCT/JP2008/062372 filed July 9, 2008.

TECHNICAL FIELD

The present invention relates to a dispersion improver for gluten, a gluten dispersion solution, active gluten using the dispersion solution, a gluten-containing food, and a method for producing a gluten gel. Also, the present invention relates to a method for dispersing gluten in an aqueous medium. Furthermore, the present invention relates to a method for producing a gluten hydrolysate.

BACKGROUND ART

Gluten is a protein derived from cereals such as wheat and rye, and forms a peculiar gel having water retentivity and viscoelasticity, and has been used as raw materials for yakifu (baked bread-like wheat gluten), namafu (dumpling-like wheat gluten) and fugashi (wheat gluten bun) for a long time. Recently, gluten is widely used for increasing of the volume of breads, and used as a quality improver for noodles and fish paste products such as kamaboko (minced and steamed fish). Gluten is mainly obtained by adding water to wheat flour, kneading to make dough, and then washing away starch from the dough with water. The resultant gluten is called "fresh gluten" and is usually a gum-like lump containing 60 to 70% of moisture. Although fresh gluten is sometimes distributed in a frozen state after freezing, the product obtained by forming fresh gluten into a powder by drying is "active gluten", which is widely distributed because of good keeping quality and low distribution cost.

Fresh gluten has poor water dispersibility and is a gum-like lump. Therefore, it is difficult to obtain active gluten by drying fresh gluten, and various pre-treatment steps are required. For example, there is a method (spray-drying method) in which fresh gluten is dispersed in water in advance using an inorganic acid such as hydrochloric acid and sulfuric acid, an organic acid such as acetic acid, an alkali such as ammonia and sodium hydroxide, and a reducing agent, followed by spray-drying. However, since the acid, alkali or reducing agent is used in the spray-drying method, flavor and color of gluten deteriorate, and physical properties such as gel strength become inferior.

Alternatively, there is a method (flash-drying method) in which fresh gluten is mixed with a dusting powder (active gluten is usually used) while finely cutting, thereby drying in an air current while adjusting moisture. In the case of the flash-drying method, since a drying treatment can be carried out within a short time, less influence is exerted on physical properties. However, there is an operation problem that it is difficult to mix a dusting powder with massive fresh gluten and excess heat is applied to the dusting powder, and therefore slight deterioration of quality cannot be avoided. There is also a method (freeze-drying method) in which fresh gluten is freeze-dried. Although freeze-drying method enables suppression of denaturation of active gluten and less change in color and physical properties, most detrimental defect is high drying cost. As described above, conventional methods for producing active gluten have problems in manufacturing technologies and quality of the resultant active gluten, and thus there has been required to develop a simple and easy method capable of providing active gluten having good quality at low cost.

In addition, it is difficult to add commercially available active gluten obtained through these drying steps during processing into various foods uniformly since it returns to a gum-like lump as a result of hydration. Usually, although active gluten is added to foods after mixing with a powder such as wheat flour, it becomes necessary to improve water dispersibility taking a complicated operation and cost into consideration. Patent Document 1 discloses a method for producing vital gluten flour in which water dispersibility is improved by adding lecithin into fresh gluten and then the mixture is uniformly emulsified and powderized by drying. However, the operation is complicated and it could not be said that the resultant active gluten has sufficient dispersibility.

Patent Document 2 discloses modified gluten flour (active gluten) containing a thickener. This patent document is designed to enhance and modify physical properties of gluten by the thickener and to impart texture such as hardness, glutinousness and smoothness to foods using the modified gluten flour, and the modified gluten flour is obtained by kneading fresh gluten containing 60 to 70% of moisture with a thickener, followed by drying and further milling, but is insoluble in water. This patent document does not teach a method in which gluten is dispersed in water by adding a specific polysaccharide to fresh gluten and mixing it.

In addition, there is a method in which a thickener is added to an acidic gluten dispersion solution to obtain an aggregate and the aggregate is dried and ground to obtain modified gluten flour (active gluten) (Patent Document 3). However, it is an essential requirement that an aggregate is obtained by bringing gluten into contact with a thickener in an acidic solution, and this patent document does not teach a method of dispersing gluten in water in the neutral region. As described above, with respect to a method of improving water dispersibility of fresh gluten and active gluten without deterioration of quality or complication of the step, a good method has never been developed.

A lot of methods of improving emulsifiability and foaming property by hydrolysis of gluten thereby improving functions have been proposed. Since wheat gluten contains a large amount of glutamine and glutamic acid in constituent amino acids, it is useful as raw materials for preparing glutamine peptide which is useful as an intestinal infusion solution material, or raw materials of an amino acid-based seasoning agent such as glutamic acid. For this reason, various studies are made for efficiently hydrolyzing gluten.

Wheat gluten is a macromolecule having a molecular weight of several hundreds, which is composed mainly of gliadin and glutenin, and is neither dissolved nor dispersed in water in the neutral pH region and becomes an aggregated lump having viscoelasticity. The method of hydrolyzing gluten is roughly classified into a degradation method using a mineral acid such as hydrochloric acid or sulfuric acid, and a degradation method using an enzyme.

According to the degradation method using an acid, gluten is hydrolyzed by dispersing in a mineral acid such as hydrochloric acid or sulfuric acid. However, since gluten is not sufficiently dispersed or an adhesive dispersion solution having high viscosity is prepared, and therefore the content of gluten is compelled to low. Because of insufficient stirring and nonuniform temperature, there have been problems that the undegraded gluten is remained, while a degraded product having extremely low molecular weight is produced, and also only a nonuniform product having wide distribution of molecular weight is obtained, and the undegraded gluten is remained resulting in low yield. There have been also problems that the resultant hydrolysate has unfavorable tastes such as pungent taste and bitterness which may be due to an acid.

There have been also problems in a degradation method using an enzyme. Since gluten is aggregated in the neutral pH region, when enzymatic hydrolysis is carried out in the neutral pH region, particularly when fresh gluten is used as a raw material, it is difficult to disperse fresh gluten and it requires a long time to sufficiently hydrolyze gluten, and thus it is not commercially practicable from an economical viewpoint. Alternatively, there is a method in which gluten is dispersed using an acid and the enzyme reaction is carried out in the acidic pH region. However, this method requires great care, in addition, the concentration cannot be increased because gluten cannot be sufficiently dispersed and remarkable thickening arises when using the acid. The resultant hydrolysate has pungent taste and bitterness due to the acid. When the hydrolysate is neutralized so as to remove the acid, saltiness is produced. To cope with these problems, various studies have been made so as to efficiently obtain a gluten hydrolysate having good quality.

For example, there is disclosed a method for obtaining a flavoring agent by dispersing gluten with a deamidating enzyme and then subjecting to a hydrolysis treatment (Patent Document 4). However, it is not easy to disperse gluten and a long reaction time is required. In addition, although a dispersion solution is not prepared, there is proposed a method for obtaining glutamine peptide efficiently by processing gluten into a porous dried granule in advance and then carrying out hydrolysis by using an enzyme (Patent Document 5). However, special processing such as freeze-drying is required so as to prepare porous gluten and the operation is complicated, and also it cannot be said that the method is not suited for practical use in view of production cost. In light of the above background, there has been required to develop a technology in which water dispersibility of gluten is improved by a simple and easy method to efficiently obtain a hydrolysate.

Patent Document 1: JP 62-14253 B
Patent Document 2: JP 2005-204649 A
Patent Document 3: JP 2007-46 A
Patent Document 4: JP 2000-515003 A
Patent Document 5: JP 2000-287698 A

DISCLOSURE OF THE INVENTION

Problems to be Solved by the Invention

An object of the present invention is to provide gluten having good water dispersibility. Another object of the present invention is to provide a method for efficiently producing active gluten, a gluten-containing food, and a gluten gel. And another object of the present invention is to provide a method for efficiently producing a gluten hydrolysate by preparing a gluten dispersion solution simply and easily and for hydrolyzing the dispersion solution.

Means for Solving the Problems

The present inventors have intensively studied so as to achieve the above objects and have found that a galacturonic acid-containing water-soluble polysaccharide remarkably improves water dispersibility of gluten and well disperses gluten regardless of the pH of the dispersion solution, and that the hydrolysis reaction efficiently proceeds to obtain a gluten degradation product within a short time. Thus, the present invention has been completed.

The present invention is:
(1) A dispersion improver for gluten, comprising a galacturonic acid-containing water-soluble polysaccharide as an active component;
(2) The dispersion improver for gluten according to (1), wherein the galacturonic acid-containing water-soluble polysaccharide is a water-soluble soybean polysaccharide or pectin;
(3) A method for dispersing gluten into an aqueous medium, comprising mixing gluten with a galacturonic acid-containing water-soluble polysaccharide;
(4) The method for dispersing gluten according to (3), wherein the pH of the dispersion solution is adjusted to 5 or more and less than 9;
(5) A gluten dispersion solution, comprising a galacturonic acid-containing water-soluble polysaccharide;
(6) The gluten dispersion solution according to (5), wherein the pH is 5 or more and less than 9;
(7) The gluten dispersion solution according to (5), wherein the galacturonic acid-containing water-soluble polysaccharide is a water-soluble soybean polysaccharide or pectin;
(8) The dispersion solution according (5), wherein the concentration of gluten in the dispersion solution is 25% by weight or less;
(9) A method for producing active gluten, comprising mixing a galacturonic acid-containing water-soluble polysaccharide, gluten and an aqueous medium to prepare a gluten dispersion solution and then drying the mixture;
(10) The method for producing active gluten according to (9), wherein the pH of the dispersion solution is 5 or more and less than 9;
(11) The method for producing active gluten according to (9), wherein the concentration of gluten in the dispersion solution is 25% by weight or less;
(12) A method for producing a gluten-containing food, comprising preparing a gluten dispersion solution containing a galacturonic acid-containing water-soluble polysaccharide, and then using the dispersion solution into the food;
(13) A method for producing a gel, comprising preparing a gluten dispersion solution containing a galacturonic acid-containing water-soluble polysaccharide, and heating the dispersion solution;
(14) A method for producing a gluten hydrolysate, comprising mixing a galacturonic acid-containing water-soluble polysaccharide, gluten and an aqueous medium to prepare a gluten dispersion solution, and hydrolyzing gluten;
(15) The method for producing a gluten hydrolysate according to (14), wherein the galacturonic acid-containing water-soluble polysaccharide is a water-soluble soybean polysaccharide or pectin;
(16) The method for producing a gluten hydrolysate according to (14), wherein the content of the galacturonic acid-containing water-soluble polysaccharide in the dispersion solution is from 0.03 to 20% by weight based on the solid content of gluten; and
(17) The method for producing a gluten hydrolysate according to (14), wherein the concentration of gluten in the dispersion solution is 25% by weight or less.

Effects of the Invention

According to the present invention, dispersibility of gluten in an aqueous medium can be improved. In the prior art of a spray-drying method, fresh gluten is dispersed in water in advance using acetic acid, ammonia or a reducing agent, and then the resultant dispersion is spray-dried to obtain active gluten. However, since the dispersion solution has adhesiveness and is remarkably thickened according to the concentration of gluten, the concentration of gluten cannot be increased, resulting in poor drying efficiency. The resultant active gluten has unfavorable characteristics such as ammonia odor, acetic acid odor and darkening. Furthermore, because of poor water dispersibility, active gluten is mixed with the other powder material in advance in the case of processing into foods. However, it is not a sufficient resolution method.

According to the present invention, since a gluten dispersion solution can be prepared simply and easily, active gluten can be efficiently prepared by drying the dispersion solution. The resultant active gluten has good flavor, color and water dispersibility, and is therefore excellent in workability in the case of processing into foods.

According to the present invention, a gluten hydrolysate can be prepared by a simple and easy operation efficiently and stably. More specifically, a gluten dispersion solution can be prepared simply and easily without a complicated pre-treatment. The concentration of gluten can be increased, thus making it possible to efficiently hydrolyze the gluten dispersion solution. The method of the present invention is an economically excellent method capable of obtaining the following effect: gluten is well dispersed and therefore the reaction homogeneously occurs, thus making it possible to prepare a degradation product with consistent quality; promotion of the hydrolysis reaction enables reduction of the undegraded gluten, resulting in high yield; and a hydrolysate can be produced within a short reaction time.

BEST MODE FOR CARRYING OUT THE INVENTION

Dispersion Improver for Gluten

The dispersion improver for gluten of the present invention includes a galacturonic acid-containing water-soluble polysaccharide. Gluten is a protein derived from cereals such as wheat and rye, containing glutenin and gliadin as main components. Although the composition slightly varies depending on the kind of cereals and the preparation method, gluten in the present invention includes conventionally known gluten derived from cereals by a conventional method without limitation, but is different from a cereal powder such as wheat flour containing gluten. Gluten in the present invention can be either fresh gluten or active gluten obtained by drying fresh gluten, and includes both of them unless otherwise specified. Active gluten (vital gluten) in the present invention is dried gluten. Fresh gluten (wet gluten) in the present invention is gluten derived from cereals, which is not subjected to a drying step, or gluten obtained by adding water to active gluten followed by kneading, and usually contains 60 to 70% by weight of moisture.

The galacturonic acid-containing water-soluble polysaccharide in the present invention means an acidic polysaccharide in which main uronic acid is galacturonic acid, and the content of galacturonic acid in polysaccharide is preferably 15% by weight or more, more preferably 60% by weight or less, and most preferably 40% by weight or less. Specific examples thereof include a soybean-derived water-soluble polysaccharide (hereinafter referred to as water-soluble soybean polysaccharide) and various pectins, for example, root crops pectins derived from potato, sweet potato or sugar beet, and citrus pectins derived from lemon or lime. The water-soluble soybean polysaccharide may be extracted and separated from a raw material or not. However, the former water-soluble soybean polysaccharide is preferred.

The water-soluble soybean polysaccharide can be obtained from a raw material containing a soybean polysaccharide by extracting with water, by heating and eluting under acidic or alkali condition, or degrading and eluting with an enzyme according to circumstances. The water-soluble soybean polysaccharide is preferably derived from cotyledon of soybeans, and by-product which is called "Okara" during the production process of soybean curd, soybean milk and soybean protein isolate can be used as a raw material. One example of a method for producing a water-soluble soybean polysaccharide in the case of separating after extraction from the raw material will be shown, but is not limited thereto.

The water-soluble soybean polysaccharide can be obtained by heating and extracting from a raw material at the pH close to an isoelectric point of soybean protein, preferably at 80° C. or more and 150° C. or less, more preferably at more than 100° C. and less than 130° C., fractionating a water-soluble fraction and drying as is, or subjecting to an activated carbon treatment, a resin adsorption treatment or an ethanol precipitation treatment to remove a hydrophobic substance or a low molecular substance, followed by drying.

The water-soluble soybean polysaccharide is a polysaccharide which contains galacturonic acid as a constituent saccharide, and also contains galactose, arabinose, xylose, fucose and rhamnose. The details of analytical results of constituent components of the water-soluble soybean polysaccharide obtained by the extraction are described in JP 4-325058 A.

Although the water-soluble soybean polysaccharide of the present invention having any molecular weight can be used, a high-molecular weight product is preferably used. The average molecular weight is preferably from several thousands to several million, for example, from 5,000 to 1,000,000. When the molecular weight is too large, viscosity excessively increases, resulting in poor workability. The average molecular weight of the water-soluble soybean polysaccharide is a value obtained by a limiting viscosimetry for measuring viscosity in a 0.1 mol $NaNO_3$ solution using Pullulan standard (Showa Denko K. K.) as a standard substance.

The method for producing a water-soluble soybean polysaccharide in which separation is not carried out after the extraction from the raw material is disclosed, for example, in JP 6-197737 A, JP 2001-204415 A and JP 2002-112724A.

Pectin is an acidic polysaccharide containing α-D-galacturonic acid as a main component, which exists as a cell wall component in vegetables and fruits. Conventionally known pectin can be used in the present invention. Pectin is prepared from various raw materials and includes those derived from pericarp of citrus, those derived from apple fruit and those derived from root crops. In the present invention, pectin derived from root crops such as potato, sweet potato and sugar beet is preferred, and pectin derived from tuber crops is most preferred. Galacturonic acid composing pectin is partially methyl-esterified and is classified into low methoxyl (LM) pectin and high methoxyl (HM) pectin according to the esterification degree. There is no particular limitation on the esterification degree of pectin in the present invention. However, with respect to citrus-derived pectin, HM pectin having the esterification degree of 50 or more is preferred since it has high effect of dispersing gluten at low viscosity.

Pectin derived from root crops will be described in detail. The root crops-derived pectin can be obtained from a raw material by extracting with water, by heating and eluting under acidic or alkali condition, or degrading and eluting with an enzyme according to circumstances. The raw material of the root crops-derived pectin includes, for example, tuber crops such as potato, sweet potato, taro, yam and konnyaku, burdock, carrot, Japanese radish, lotus and sugar beet, and preferably tuber crops. The raw material can optionally utilize cakes in which starchiness, oligosaccharides such as sucrose, and protein have been removed by a conventional method. One example of the method for producing pectin derived from potato as pectin derived from root crops will be described, but is not limited thereto.

The pectin derived from potato can be obtained by heating and extracting from potato starch cake as a raw material in a weak acidic region within a range from pH 3.8 to 5.3, preferably at 80° C. or more and 150° C. or less, more preferably at more than 100° C. and less than 130° C., fractionating a water-soluble fraction and drying as is, or subjecting to an activated carbon treatment, a resin adsorption treatment or an ethanol precipitation treatment to remove a hydrophobic substance or a low molecular substance, followed by drying. The method is described in detail in Patent Documents WO 2000/43424 and WO 2004/039176.

In the present invention, although there is no particular limitation on the molecular weight of pectin derived from root crops, especially pectin derived from tuber crops, the average molecular weight is preferably from several tens of thousands to several hundreds of thousands, and specifically from 50,000 to 300,000. The average molecular weight of the pectin derived from root crops was measured according to the above-described method for measuring the molecular weight of the water-soluble soybean polysaccharide.

Among these galacturonic acid-containing water-soluble polysaccharides, the water-soluble soybean polysaccharide and pectin derived from tuber crops are particularly excellent in the effect of improving water dispersibility of gluten. The water-soluble soybean polysaccharide and pectin derived from potato are preferred since they are excellent in the effect and can further decrease the viscosity of the gluten dispersion solution. These galacturonic acid-containing water-soluble polysaccharides can be used alone, or two or more kinds of them can be used in combination.

The dispersion improver of the present invention can be used regardless of the form of gluten and can improve dispersibility of gluten. When fresh gluten is dispersed, for example, fresh gluten can be added to an aqueous solution of the dispersion improver of the present invention, followed by mixing. Active gluten can also be dispersed in water in the same manner. Alternatively, a mixture powder of active gluten and dispersion improver is well dispersed in water. Fresh gluten or active gluten is not dispersed to form an aggregated lump even when added to water followed, by stirred. However, fresh gluten or active gluten can be dispersed by using the dispersion improver of the present invention.

Traditionally, gluten has been dispersed in water by using acetic acid or ammonia. However, since the dispersion solution obtained by using acetic acid has adhesiveness and has high viscosity, it is impossible to increase the concentration of gluten. In addition, gluten obtained by drying the dispersion solution causes not only acid taste, bitterness, foreign odor and change in color, but also deterioration of extensibility and elasticity required for gluten. While the dispersion solution obtained by using ammonia has not high viscosity, active gluten obtained by drying the dispersion solution has foreign odor and darkening, also tends to inferior in extensibility. As described above, when gluten is dispersed by using the acid or alkali, flavor and physical properties deteriorate, and thus an adverse influence is exerted on applications and quality of foods. By using the dispersion improver of the present invention, unlike the case where gluten is dispersed by using the acid or alkali, a dispersion solution having low viscosity and low adhesiveness is obtained. The dispersion improver of the present invention can well disperse gluten regardless of the pH, and can also be used in combination with the acid or alkali.

Incidentally, when the dispersion improver and fresh gluten are kneaded by a kneader, viscosity and extensibility of gluten are enhanced, but dispersibility is not obtained. Although this reason is not clear, those obtained by kneading or those obtained by kneading, drying and milling are not dispersed in water to form an aggregated lump. Therefore, when the dispersion improver of the present invention is used for fresh gluten, it is preferred to suppress kneading not so as to enhance viscosity or extensibility, or to add water so as to adjust the concentration of gluten to 25% by weight or less, and to disperse gluten by mixing.

The amount of the dispersion improver to be used for gluten varies depending on the concentration of gluten. It is possible to well disperse gluten by increasing the amount of the galacturonic acid-containing water-soluble polysaccharide in proportion to the concentration of gluten in the dispersion solution. When the concentration of gluten in the gluten dispersion solution is approximately 25% by weight or less, the amount is preferably from 0.03 to 20% by weight, more preferably from 0.1 to 10% by weight, further preferably from 0.5 to 10% by weight, and most preferably 1 to 5% by weight, in terms of galacturonic acid-containing water-soluble polysaccharide based on the solid weight of gluten. When the amount is within the above range, gluten can be sufficiently dispersed without causing aggregation. The effect is the same even if the amount is more than the above range.

The form of the dispersion improver for gluten is not particularly limited and can be in solution or powder form. As long as the effect is not prevented, the dispersion improver can contain food components other than the galacturonic acid-containing water-soluble polysaccharide, and other additives can be appropriately used in combination. Examples of other additives include emulsifiers such as lecithin, glycerin fatty acid ester, sucrose fatty acid ester and sorbitan fatty acid ester; oily substances such as common animal and vegetable fats and oils, and fat-soluble vitamins such as tocopherol; sugars such as sucrose, maltose and trehalose; sugar alcohol; polysaccharides such as dextrin, agar, carrageenan, furcelleran, tamarind seeds polysaccharides, tara gum, karaya gum, xanthane gum, sodium alginate, tragacanth gum, guar gum, locust bean gum, pullulan, gellan gum, gum arabic, hyaluronic acid, cyclodextrin, chitosan, carboxymethyl cellulose (CMC) and propylene glycol alginate, various starches such as modified starch; and hydrolysates of these polysaccharides; proteinaceous substances such as gelatin, albumins such as whey, casein sodium, soluble collagen, egg white, egg yolk powder and soybean protein; salts such as calcium enriching agent; and pH adjustors such as sodium acetate.

Method for Dispersing Gluten in an Aqueous Medium

Gluten can be dispersed in an aqueous medium by mixing gluten with a galacturonic acid-containing water-soluble polysaccharide. When fresh gluten is dispersed in the aqueous medium, for example, fresh gluten can be added to an aqueous solution of a galacturonic acid-containing water-soluble polysaccharide, followed by mixing. Active gluten can also be dispersed in an aqueous medium in the same manner. Alternatively, active gluten can be well dispersed in the aqueous medium by mixing active gluten powder with a galacturonic acid-containing water-soluble polysaccharide powder in advance. Although fresh gluten or active gluten is not dispersed to form an aggregated lump even when added to the aqueous medium followed by stirring, fresh gluten or active gluten can be uniformly dispersed by the present method.

According to the dispersion method of the present invention, gluten can be well dispersed without adjusting the pH of the aqueous medium with an acid or alkali, the acid or alkali may also be used. However, the present method is useful at the pH within a range from 5 to 9 where gluten is not usually dispersed sufficiently. When the pH is preferably 5.3 or more, more preferably 5.5 or more, and preferably 8 or less, more preferably 6.9 or less, high dispersion effect is exerted, and viscosity of the dispersion solution decreases.

Gluten Dispersion Solution

The gluten dispersion solution of the present invention includes a galacturonic acid-containing water-soluble polysaccharide. Since gluten is not usually dispersed or not easily dispersed at the pH within a range from 5 to 9, it is difficult to prepare a dispersion solution at the pH with the above range. However, the dispersion solution of the present invention also includes the solution at the pH with the above range. Regarding the dispersion solution having the pH within a range of preferably 5.3 or more, more preferably 5.5 or more, and preferably pH 8 or less, more preferably 6.9 or less, gluten is well dispersed and the dispersion solution has low viscosity.

Particularly, it is preferred that the galacturonic acid-containing water-soluble polysaccharide is a water-soluble soybean polysaccharide or pectin derived from potato because the dispersion solution has low viscosity even when the dispersion solution contains a large amount of the polysaccharides. In addition, the concentration of gluten in the dispersion solution is not particularly limited, but is preferably 25% by weight or less since it is easy to prepare.

Method for Producing Active Gluten

The method for producing active gluten of the present invention includes preparing a gluten dispersion solution containing a galacturonic acid-containing water-soluble polysaccharide, and drying the dispersion solution, and thus active gluten having excellent flavor, color and dispersibility can be prepared. Gluten obtained by a conventionally known method can be used. Although gluten cannot be dispersed to form a gum-like lump even when water is merely added to gluten, gluten can be easily dispersed in the presence of the galacturonic acid-containing water-soluble polysaccharide. In addition, the resultant dispersion solution has low viscosity and low adhesiveness as compared with a conventional dispersion solution prepared by dispersing gluten using an acid or alkali. For example, a fresh gluten dispersion solution containing 10% by weight of fresh gluten (pH 4.6) prepared by dispersing gluten using acetic acid has viscosity of about 500 mPa·s (a measuring method thereof is described later). In contrast, a fresh gluten dispersion solution having the same concentration, prepared by dispersing fresh gluten in water containing a galacturonic acid-containing water-soluble polysaccharide, has viscosity of about 17 mPa·s.

Upon preparation of the dispersion solution, there is no particular limitation on the mixing order of gluten, the galacturonic acid-containing water-soluble polysaccharide and water. For example, gluten can be dispersed in an aqueous solution of galacturonic acid-containing water-soluble polysaccharide, and gluten can also be well dispersed when water is added to gluten and then the galacturonic acid-containing water-soluble polysaccharide is added followed by mixing. In the method for, producing active gluten of the present invention, although there is no need to use an acid, an alkali or a reducing agent, they can also be used. If the acid or alkali is used so as to adjust the pH of the dispersion solution within a range of preferably 5 or more, more preferably 5.3 or more, and preferably less than 9, more preferably 8 or less, deterioration of quality of active gluten can be reduced.

Also, the concentration of gluten (usually containing 60 to 70% by weight of moisture) in the dispersion solution is not particularly limited, and is preferably 25% by weight or less, more preferably 20% by weight or less, and preferably 5% by weight or more, more preferably 8% by weight or more. When the concentration of gluten is within the above range, the resultant dispersion solution has low viscosity and excellent workability, and also has good drying efficiency.

Also, the content of the galacturonic acid-containing water-soluble polysaccharide in the dispersion solution is not particularly limited, and is preferably from 0.03 to 20% by weight, and more preferably from 0.1 to 10% by weight, based on the solid weight of gluten. When the content of the galacturonic acid-containing water-soluble polysaccharide is within the above range, gluten can be sufficiently dispersed without causing aggregation, and thickening of the dispersion solution by the galacturonic acid-containing water-soluble polysaccharide can also be suppressed. The effect is the same even if the amount is more than the above range.

As long as the effect is not prevented, the dispersion solution can contain food components other than gluten. For example, for the purpose of improving physical properties of the active gluten gel, it is possible to use soybean-derived proteins, wheat-derived proteins such as gliadin and glutenin, milk-derived proteins such as casein sodium, reducing agents such as sodium hydrogen sulfite, with gluten.

The dispersion solution is dried to obtain active gluten. Conventionally known drying methods can be used without particular limitation and examples thereof include a spray-drying method, a flash-drying method, a vacuum drying method and a freeze-drying method. Among these methods, a spray-drying method and a flash-drying method are preferred since the production cost can be saved. If necessary, the resultant active gluten can be mechanically milled and then classified by screened out.

The vital gluten obtained in this manner is excellent in flavor, color and dispersibility in water as compared with a conventional product obtained by a spray-drying method using an acid, an alkali or a reducing agent. Active gluten obtained by the present method is excellent in dispersibility as compared with a conventional product and the resultant dispersion solution has low viscosity and low adhesiveness. For example, the dispersion solution, which is prepared by dispersing active gluten containing 0.2% by weight of galacturonic acid-containing water-soluble polysaccharide obtained by the present method so as to adjust the concentration of gluten to 10% by weight in water, has viscosity of about 20 mPa·s (a measuring method thereof is described later). In contrast, active gluten obtained by a conventional spray-drying is not dispersed to form an aggregated lump even when water is added so as to adjust to the same concentration.

By heating the dispersion solution, a gel having viscoelasticity peculiar to gluten can be obtained. Active gluten of the present invention is easily dispersed in water and it is easily to handle the dispersion solution because of low viscosity. At the same time, the dispersion solution can form a gel having intrinsic viscoelasticity of gluten by heating. Therefore, the active gluten of the present invention, which can be used for various foods as usual, is excellent.

Method for Producing a Gluten-Containing Food

The method for producing a gluten-containing food of the present invention includes preparing a gluten dispersion solution containing a galacturonic acid-containing water-soluble polysaccharide and using the same. The gluten-containing food includes products prepared from dough composed mainly of wheat flour such as bread and cake, doughnut, cookie, noodle, pasta, pizza dough, pie dough, crepe, taiyaki (fish-shaped cake filled with red bean paste), steamed bread, and skins of Chinese meat-and-vegetable dumpling and steamed Chinese meat dumpling. In addition, fish paste products such as boiled fish paste, tubular fish meat, fried fish balls and fish sausage, and livestock meat product such as ham and sausage are included although these foods are not foods composed mainly of the wheat flour.

Except for a special case such as Chinese noodle using "Kansui" or alkali water, these foods are in the pH region where gluten is not dispersed. Therefore, for the purpose of uniformly mixing gluten with dough, the gluten is mixed with wheat flour in powder form. However, it requires great care because classification may be occurred. However, the method for producing a gluten-containing food of the present invention includes preparing a gluten dispersion solution containing a galacturonic acid-containing water-soluble polysaccharide and using the dispersion solution, and is an excellent method capable of uniformly mixing gluten with dough. For example, in udon (Japanese noodle), when gluten is used in powder form, it is not easy to uniformly mix gluten with dough, and the noodle obtained by heating the mixture does not have sufficient elasticity, glutinousness and extensibility. However, according to the method of the present invention, by preparing a gluten dispersion solution containing a galacturonic acid-containing water-soluble polysaccharide and using the dispersion solution, gluten can be uniformly mixed with dough, and thus a noodle having excellent elasticity and glutinousness can be prepared.

Method for Producing a Gluten Gel

The method for producing a gluten gel of the present invention includes preparing a gluten dispersion solution containing a galacturonic acid-containing water-soluble polysaccharide and gelating gluten by heating the dispersion solution. The gluten gel of the present invention includes gluten derived from cereals as a main component and has viscoelastic texture derived from a gluten gel. Specific examples thereof include namafu, fried wheat gluten obtained by frying namafu, wheat gluten bun, yakifu obtained by mixing wheat flour, baking powder and glutinous rice flour to gluten, kneading the mixture and baking the kneaded mixture, and gluten meat. Gluten can be any of fresh gluten prepared from cereals, active gluten, and fresh gluten obtained by kneading active gluten with water.

To the gluten dispersion solution, in addition to a galacturonic acid-containing water-soluble polysaccharide, other raw materials can be optionally added as long as the dispersibility is not prevented. The concentration of gluten in dough containing the dispersion solution is not particularly limited, and is preferably 5% by weight or more, more preferably 10% by weight or more, and preferably 35% by weight or less, more preferably 25% by weight or less. When the concentration of gluten is within the above range, the dispersion solution has fluidity and is easily molded, and also texture peculiar to a gluten gel can be obtained. The heating temperature is not particularly limited, and is usually from 60 to 70° C. or more at which gluten begins to cause denaturation. The dispersion solution is optionally filled in a mold, molded and then heated. The method of heating the dispersion solution includes, but is not limited to, steaming, boiling, frying or baking, as long as the dispersion solution is completely heated. Although the dispersion solution has fluidity before heating, gluten is gelated by heating to obtain a gluten gel having elastic texture peculiar to gluten.

Because of poor fluidity due to viscoelasticity of gluten, it is difficult to mold in the case of preparation of a gluten gel. Therefore, traditionally, a wheat gluten bun has been prepared by adding refined rice flour or the like to gluten, kneading the mixture to give dough and molding the dough by tearing off, followed by steaming and heating. Because of viscoelasticity of the dough, it is difficult to mold using a mold, and even now the wheat gluten bun is produced only by a manual labor of a workman, and continuous production by machine has never been achieved. However, according to the method for producing a gluten gel of the present invention, not only a dispersion solution is easily prepared, but also operations from molding to heating can be continuously carried out.

Method for Producing a Gluten Hydrolysate

In the production of a gluten hydrolysate, the concentration of a gluten (usually containing 60 to 70% by weight of moisture) dispersion solution to be subjected to the hydrolysis reaction is not particularly limited, and is preferably 25% by weight or less, more preferably 20% by weight or less, and preferably 5% by weight or more, more preferably 8% by weight or more. When the concentration of a gluten dispersion solution is within the above range, the dispersion solution has low viscosity, resulting in excellent workability and high production efficiency.

Preferred amount of the galacturonic acid-containing water-soluble polysaccharide to be used for gluten varies depending on the concentration of the objective gluten dispersion solution. Gluten can be well dispersed by increasing the amount of the galacturonic acid-containing water-soluble polysaccharide in proportion to the concentration of gluten in the dispersion solution. When the concentration of the gluten dispersion solution is approximately 25% by weight or less, the amount is preferably from 0.03 to 20% by weight, and more preferably from 0.1 to 10% by weight, in terms of the galacturonic acid-containing water-soluble polysaccharide based on the solid weight of fresh gluten. When the amount is within the above range, gluten can be sufficiently dispersed without causing aggregation. The effect is the same even if the amount is more than the above range.

In the present invention, since gluten can be dispersed in the neutral pH region by adding a galacturonic acid-containing water-soluble polysaccharide, there is no need of adjusting the pH to the acidic or alkali region of the reaction solution when hydrolysis is carried out by using an enzyme. However, when it is necessary to use an enzyme having an active region in the acid or alkali region, the pH of the dispersion solution can be freely adjusted by using an acid such as hydrochloric acid or an alkali such as sodium hydroxide. Alternatively, chemical degradation can be carried out by adding an acid to the dispersion solution. It is difficult to disperse gluten by using a mineral acid such as hydrochloric acid and an aggregate is remained. However, when an acid is added after dispersing gluten by adding the galacturonic acid-containing water-soluble polysaccharide of the present invention, an acidic gluten dispersion solution can be easily prepared. The resultant acidic gluten dispersion solution can be hydrolyzed by using an enzyme or by acid degradation.

There is no limitation on the method for preparing a dispersion solution, and also there is no limitation on the mixing order of gluten, the galacturonic acid-containing water-soluble polysaccharide and an aqueous medium. For example, fresh gluten or active gluten can be added to an aqueous solution of the galacturonic acid-containing water-soluble polysaccharide, followed by mixing. Alternatively, a mixture of active gluten and dispersion improver in powder form can be added to an aqueous medium, followed by stirring. Usually, fresh gluten or active gluten is not dispersed to form an aggregated lump even when added to water followed by stirred. However, fresh gluten or active gluten can be dispersed by using the galacturonic acid-containing water-soluble polysaccharide.

The method for hydrolyzing gluten using the above described dispersion solution is not particularly limited and examples thereof include a chemical degradation method using an inorganic acid such as hydrochloric acid and sulfuric acid, or an alkali such as sodium hydroxide and potassium hydroxide, and a method using an enzyme. Among these methods, in the case of hydrolysis using an enzyme in the neutral region, the resultant hydrolysate has good flavor and also the step can be simplified since adjustment of the pH with an acid or alkali is not required. In addition, since it is possible to prepare a gluten dispersion solution having low viscosity in which gluten is well dispersed, the hydrolysis reaction is promoted and a product can be obtained in high yield within a short time.

In the hydrolysis using an enzyme, conventionally known methods can be used without particular limitation. Although the present invention has a main effect capable of efficiently carrying out the enzyme reaction even in the neutral region, the enzyme reaction can also be carried out in the acidic or alkali region. At the same time, the chemical degradation method using an acid or alkali can also be carried out by a conventionally known method. In addition, the method for dispersing gluten of the present invention can be preferably used for various enzyme reactions such as transfer reaction with transglutaminase and deamidation reaction with deamidase, as well as for the hydrolysis.

Regarding the method for recovering a gluten hydrolysate, gluten is hydrolyzed and subjected to centrifugal separation, and then the supernatant can be treated by a method which can be usually used by a skilled person in the art, for example, a spray-drying method or a freeze-drying method. If necessary, the dried product can be mechanically milled, and then, can also be powderized by screening.

When the galacturonic acid-containing water-soluble polysaccharide is removed from the gluten hydrolysate, the galacturonic acid-containing water-soluble polysaccharide can be separated and removed by a conventional method such as centrifugal separation, alcohol purification or membrane treatment, if necessary, after degradation using a hydrolase such as pectinase or hemicellulase.

The gluten hydrolysate obtained by the present invention can be used for conventionally known applications without any limitation. For example, the gluten hydrolysate is used for foods such as bread, noodle, kneaded product, confectionery and wheat product and exerts the effect of improving quality, and also can be added to wheat flour or other raw materials in advance. Similarly, the gluten hydrolysate obtained by the present invention can also be used as glutamine peptide which is a supply source of glutamin, or a raw material of an amino acid-based seasoning agent such as glutaminic acid.

Next, the measuring method used in the present invention is described.

(Viscosity of Gluten Dispersion Solution)

Immediately after uniformly dispersing gluten in water in the amount which is 10 times more than the dry weight thereof, viscosity at 25° C. is measured by a rotational viscometer (manufactured by TOKIMEC Co.).

EXAMPLES

Embodiments of the present invention will be explained below with Examples. In the Examples, all percentages are by weight.

Example 1

Water-Soluble Soybean Polysaccharide-Containing Active Gluten

To 3.5 kg of distilled water containing 0.06% by weight of water-soluble soybean polysaccharide ("SOYAFIVE-S" manufactured by Fuji Oil Co., Ltd., average molecular weight: 550,000, content of galacturonic acid: 18.2 parts by weight), 1.5 kg of fresh gluten (moisture content: 67% by weight) prepared from a wheat flour was added, followed by uniformly dispersing it with Homo Disper (Tokushu Kika Kogyo Co., Ltd.). Gluten was well dispersed and the resultant dispersion solution had low viscosity. Next, the dispersion solution was supplied to a spray dryer while stirring to obtain active gluten.

Example 2

Active gluten was obtained under the same conditions as in Example 1, except that pectin derived from potato was used in place of the water-soluble soybean polysaccharide. Pectin derived from potato was prepared in accordance with Example 2 of Patent Document WO 2000/43424 (average molecular weight: 180,000, content of galacturonic acid: 38.5% by weight). Similarly, gluten was well dispersed and the resultant dispersion solution had low viscosity.

Example 3

Active gluten was obtained under the same conditions as in Example 1, except that pectin derived from citrus (average molecular weight: 250,000, content of galacturonic acid: 80.3% by weight, esterification degree: 67%) was used in place of the water-soluble soybean polysaccharide. Similarly, gluten was well dispersed and the resultant dispersion solution had low viscosity.

Comparative Example 1

In Example 1, the pH was adjusted to 4.6 by using an aqueous acetic acid solution in place of the aqueous water-soluble soybean polysaccharide solution. Since the dispersion solution is an adhesive dispersion solution having viscosity of about 500 mPa·s and causes deterioration of drying efficiency during spray-drying, the concentration of gluten in the dispersion solution was adjusted to 8% by weight by further adding water in terms of the dried product. The viscosity of the 8% by weight of the dispersion solution was about 100 mPa·s. Except for the above points, active gluten was obtained under the same conditions as in Example 1.

Comparative Example 2

In Example 1, the pH was adjusted to 9.3 by using an aqueous ammonia solution in place of the aqueous water-soluble soybean polysaccharide solution. Except for the above points, active gluten was obtained under the same conditions as in Example 1.

(Control Group 1)

The same fresh gluten as in Example 1 was freeze-dried, ground and then filtered to obtain active gluten. Each of active glutens obtained in Examples 1, 2 and 3, Comparative Examples 1 and 2, and Control Group 1 was added to distilled water so as to adjust the concentration to 10% by weight while stirring, and dispersibility in water was evaluated. Next, active glutens were added to distilled water so as to adjust the concentration to 35% by weight to obtain fresh glutens respectively. With respect to flavor, color and physical properties of the gel, sensory evaluation was carried out by 7 panelists. The results were shown in Table 1. Evaluation criteria of dispersibility in water of active gluten were shown in Table 2. Physical properties of the gel with extensibility and elasticity were rated good and evaluation was carried out based on the control Group.

Although water was added so as to adjust the concentration to 10% by weight, fresh gluten of Control Group 1 was not dispersed to form an aggregated lump. Active glutens of Comparative Example 1 and Comparative Example 2 had strong aggregation properties and were not easily dispersed, and thus a 10% by weight concentration of dispersion solution could not be prepared. A gel containing 35% by weight of active gluten of Comparative Example 1 had foreign odor and

TABLE 1

Viscosity of each gluten dispersion solution

|  |  | Example 1 | Example 2 | Example 3 | Comparative Example 1 | Comparative Example 2 | Control Group 1 |
|---|---|---|---|---|---|---|---|
| Fresh gluten | Dispersant |  |  |  |  |  |  |
|  | Water-soluble soybean polysaccharide | 0.06% Solution | — | — | — | — | — |
|  | Pectin derived from potato | — | 0.06% Solution | — | — | — | — |
|  | Pectin derived from citrus | — | — | 0.06% Solution | — | — | — |
|  | Acetic acid | — | — | — | Adjusted to pH 4.6 | — | — |
|  | Ammonia | — | — | — | — | Adjusted to pH 9.3 | — |
| Active gluten | 10% Dispersion solution |  |  |  |  |  |  |
|  | Dispersibility | 4 | 4 | 3.5 | 4 | 4 | 1 |
|  | pH | 6.5 | 6.5 | 6.5 | 4.6 | 9.3 | — |
|  | Viscosity (mPa·s) | 17 | 18 | 27 | 528 | 82 | — |
|  | 10% Dispersion solution |  |  |  |  |  |  |
|  | Dispersibility | 4 | 4 | 3.5 | 2 | 2 | 1.5 |
|  | 35% Gluten |  |  |  |  |  |  |
|  | Dispersibility | 1 | 1 | 1 | 1 | 1 | 1 |
|  | Flavor | ⊙ Good | ⊙ Good | ⊙ Good | Δ Foreign taste and foreign odor | Δ Foreign odor | ⊙ Good |
|  | Color | ⊙ Good | ⊙ Good | ⊙ Good | ◯ slight browning occurred | X yellowish browning occurred | ⊙ Good |
|  | Physical properties of gel | ◯ Good although extensibility and elasticity are slightly low | ◯ Good although extensibility and elasticity are slightly low | ◯ Good although extensibility and elasticity are slightly low | X Both extensibility and elasticity are low | Δ Low extensibility | ⊙ Good |

TABLE 2

Evaluation criteria of dispersibility in water
Evaluation criteria of dispersibility in water 4: smoothly dispersed without formation of aggregate
3: dispersed with some small aggregates of gluten
2: hardly dispersed with a lot of aggregates
1: not dispersed with a gum-like lump When a water-soluble soybean polysaccharide or pectin were added, fresh gluten was well dispersed in the neutral pH region to obtain a dispersion solution having low viscosity, and active gluten could be efficiently obtained by spray-drying. The resultant active gluten was free from foreign odor and showed good color. Furthermore, water was added to active gluten so as to adjust the concentration to 10% by weight, followed by mixing. As a result, active gluten was well dispersed. When water was added to active gluten so as to adjust the concentration to 35% by weight, fresh gluten having elasticity was obtained. The resultant fresh gluten was good in both flavor and color and showed extensibility and elasticity which are slightly lower than that of the control Group, but had texture peculiar to gluten.

slight acid taste, and showed change of color into slightly reddish color. The gel showed both low extensibility and elasticity, and gel strength was low. Similarly, a gel containing 35% by weight of active gluten obtained in Comparative Example 2 had strong foreign odor and showed change of color into yellowish to reddish color. Also, the gel had low extensibility.

Example 4

Comparison of Dispersibility in Water of Active Gluten by Each Dispersant

The effect of improving dispersibility of gluten by the dispersion improver of the present invention and other additives was evaluated. Each of dispersion improvers or other additives shown in Table 3 was added in distilled water at 20° C., followed by stirring to obtain a solution or dispersion solution. The concentration of the dispersion improver or additives shown in Table 3 was expressed by % by weight assumed that the concentration of active gluten was 100% by weight. To the solution or dispersion solution, active gluten (solid content: 95.5 parts by weight) obtained by Control Group 1 was added so as to adjust the concentration to 10% by weight while stirring (500 rpm) with Three-One Motor (Shinto Scientific Co., Ltd.) and then dispersibility of gluten was evaluated. Dispersibility was evaluated by criteria shown in Table 2. With respect to a median diameter shown in Table 3, the median diameter of gluten particles was measured by SALD-2000A (Shimadzu Corporation) after a 10% by weight of the active gluten dispersion solution examples, dispersibility of which could be confirmed by the above evaluation test, was stirred (8,000 rpm) by T.K. Homo Mixer (Tokushu Kika Kogyo Co., Ltd.). The additive amount of each additive was expressed by % by weight based on gluten. Three items, dispersibility, viscosity and median diameter were comprehensively evaluated.

Example 5

Evaluation in Udon 40 g of active gluten obtained in Example 1 and 80 g of salt were mixed with 900 g of water to prepare a gluten dispersion solution. The gluten dispersion solution as kneading water was added to 2,000 g of medium-strength flour, followed by kneading for 15 minutes with a mixer to obtain dough. Next, the dough was compounded and rolled by a roller and then cutting out by a No. 8 cutting blade to obtain noodle strings. Next, the resultant noodle strings were gelatinized by boiling in boiling water. After draining of hot water, the boiled noodle strings were put in soup and sensory evaluation was carried out.

TABLE 3

Viscosity of gluten upon addition of various additives

| | Test No. | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Additive amount | | | | | | | | | | | | | | | | | | |
| Water-soluble soybean polysaccharide | — | 0.05 | 0.1 | 0.5 | 1.0 | 5.0 | 10.0 | — | — | — | — | — | — | — | — | — | — | — |
| Pectin derived from potato | — | — | — | — | — | — | — | 0.5 | — | — | — | — | — | — | — | — | — | — |
| HM pectin | — | — | — | — | — | — | — | — | 0.5 | — | — | — | — | — | — | — | — | — |
| Na-alginate | — | — | — | — | — | — | — | — | — | 0.5 | — | — | — | — | — | — | — | — |
| Pullulan | — | — | — | — | — | — | — | — | — | — | 0.5 | — | — | — | — | — | — | — |
| Gum arabic | — | — | — | — | — | — | — | — | — | — | — | 0.5 | — | — | — | — | — | — |
| λ-Carrageenan | — | — | — | — | — | — | — | — | — | — | — | — | 0.5 | — | — | — | — | — |
| CMC-Na | — | — | — | — | — | — | — | — | — | — | — | — | — | 0.5 | — | — | — | — |
| Xanthane gum | — | — | — | — | — | — | — | — | — | — | — | — | — | — | 0.5 | — | — | — |
| Gellan gum | — | — | — | — | — | — | — | — | — | — | — | — | — | — | — | 0.5 | — | — |
| Na-hydrogen sulfite | — | — | — | — | — | — | — | — | — | — | — | — | — | — | — | — | 0.5 | — |
| Soybean lecithin | — | — | — | — | — | — | — | — | — | — | — | — | — | — | — | — | — | 0.5 |
| Evaluation results | | | | | | | | | | | | | | | | | | |
| Dispersibility | 1.5 | 3 | 4 | 4 | 4 | 4 | 4 | 4 | 3.5 | 2.5 | 2 | 2 | 2 | 2 | 2 | 2 | 2 | 2 |
| Viscosity (mPa·s) | — | 27.6 | 18.3 | 8.8 | 8.8 | 9.8 | 26.5 | 9.0 | 25.3 | — | — | — | — | — | — | — | — | — |
| Median diameter (μm) | — | 117 | 74 | 65 | 28 | 42 | 61 | 66 | 293 | — | — | — | — | — | — | — | — | — |
| Comprehensive evaluation | X | Δ | ⊙ | ⊙ | ⊙ | ⊙ | ○ | ⊙ | Δ | X | X | X | X | X | X | X | X | X |

From the results shown in Table 3, a water-soluble soybean polysaccharide, pectin derived from root crop, pectin derived from plant pericarp enabled dispersion of active gluten, and the water-soluble soybean polysaccharide and pectin derived from potato were particularly excellent in the point where gluten could be dispersed in fine particles. When the additive amount of the water-soluble soybean polysaccharide was 0.05% by weight, dispersion was slightly insufficient and a gum-like lump could be confirmed. When the additive amount was 0.1% by weight or more, gluten was dispersed extremely well. It was shown that good dispersibility can be obtained by increasing the amount of the dispersion improver according to the concentration of gluten. When the additive amount was too large, viscosity of the dispersion solution tended to increase. However, a product having good dispersibility and low viscosity could be obtained by adjusting the additive amount.

Additives other than the water-soluble soybean polysaccharide and pectin scarcely had the function of dispersing gluten in water, and an aggregated lump was produced.

Comparative Example 3

Active gluten obtained in Comparative Example 1 could not be uniformly dispersed in kneading water and therefore added after mixing with medium-strength flour. Udon was obtained under the same conditions as in Example 5 except for the above points.

Comparative Example 4

Active gluten obtained in Comparative Example 2 could not be uniformly dispersed in kneading water and therefore added after mixing with medium-strength flour. Udon was obtained under the same conditions as in Example 5 except for the above points.

(Control Group 2)

Active gluten obtained in Control group 1 could not be uniformly dispersed in kneading water and therefore added after mixing with medium-strength flour. Udon was obtained under the same conditions as in Example 5 except for the above points.

(Control Group 3)

Udon was obtained under the same conditions as in Example 5, except that active gluten was not used.

(Method for Sensory Evaluation)

With respect to texture (elasticity, glutinousness) and flavor of noodles of Example 5, Comparative Examples 3 and 4, and Control Group 2 and Control Group 3, sensory evaluation was carried out by 7 panelists. Five-rank evaluation was carried out using Control group 3 as standard. As the numerical value increases, texture of noodles became better. The results were shown in Table 4.

TABLE 4

Effect on udon

| Texture | Example 5 | Comparative Example 3 | Comparative Example 4 | Control Group 2 | Control Group 3 |
|---|---|---|---|---|---|
| | | Active gluten | | | |
| | Example 1 Water-soluble soybean polysaccharide | Comparative Example 1 Acetic acid | Comparative Example 2 Ammonia | Control Group 1 | — |
| Elasticity | 5 | 3 | 4 | 5 | 1 |
| Glutinousness | 5 | 3 | 3 | 4.5 | 1 |
| Flavor | 5 | 2 | 1 | 5 | 5 |

In Example 5, active gluten containing a water-soluble soybean polysaccharide could be added to udon after dispersing in kneading water, and showed good texture, elasticity and glutinousness of which was nearly the same as that of Control Group 2. The reason is considered that gluten could be uniformly mixed with the entire noodle dough by dispersing active gluten in water in advance to prepare a dispersion solution and kneading the dispersion solution as kneading water with wheat flour. In a conventional method, dough was prepared by mixing with wheat flour since active gluten had poor dispersibility. However, according to this method, the function of gluten could not be sufficiently exerted since classification of the powders was occurred and sufficient water absorption of gluten was not obtained.

The udon of Example 5 had good flavor free from foreign taste and foreign odor. In contrast, the noodle of Comparative Example 3 had slight foreign taste and the texture was insufficient in both glutinousness and elasticity as compared with Control Group 2. The noodle of Comparative Example 4 exhibited strong foreign taste, and it was thus unfavorable. The texture of the noodle exhibited increased elasticity, but was insufficient in glutinousness.

Example 6

Wheat Gluten Bun 180 g of active gluten obtained in Control Group 1 was mixed with 1 g of water-soluble soybean polysaccharide, 80 g of refined rice flour, 40 g of sugar and 16 g of mugwort powder, and then adding 440 g of water, followed by mixing to obtain a gluten dispersion solution. Next, the dispersion solution was poured into a mold and a red bean sweet paste was put therein. After steaming at 80° C. for 15 minutes and cooling in cold water, a wheat gluten bun was obtained. Viscoelastic texture of gluten as a feature of the wheat gluten bun was obtained. Traditionally, the dough of the wheat gluten bun was a viscoelastic lump with no fluidity and it was difficult to mold using a mold and there was no way except for hand work. However, since this dough maintains good fluidity before heating and can be processed into various shapes corresponding to the mold, molding can be carried out by pouring into the mold and continuous production can also be carried out.

Test Example 1

0.176% by weight of aqueous solution of a water-soluble soybean polysaccharide ("SOYAFIVE-S") used in Example 1 was prepared and commercially available active gluten (F-marked wheat protein manufactured by Hokkoku Food Co., Ltd.) obtained by a freeze-drying method was added thereto while stirring. Next, the pH was adjusted within a range from 5.0 to 7.0 using ammonia water or an acetic acid solution, followed by stirring with Homo Mixer. The final concentration of the water-soluble soybean polysaccharide was 0.15% by weight and the concentration of active gluten was 15% by weight. Immediately after dispersion, the particle diameter (median diameter) was measured. The particle diameter was measured by a particle size distribution analyzer (SALD-2000A, manufactured by Shimadzu Corporation) and used as an indicator of dispersibility. As the particle diameter decreased, dispersibility became better.

Figure 1:
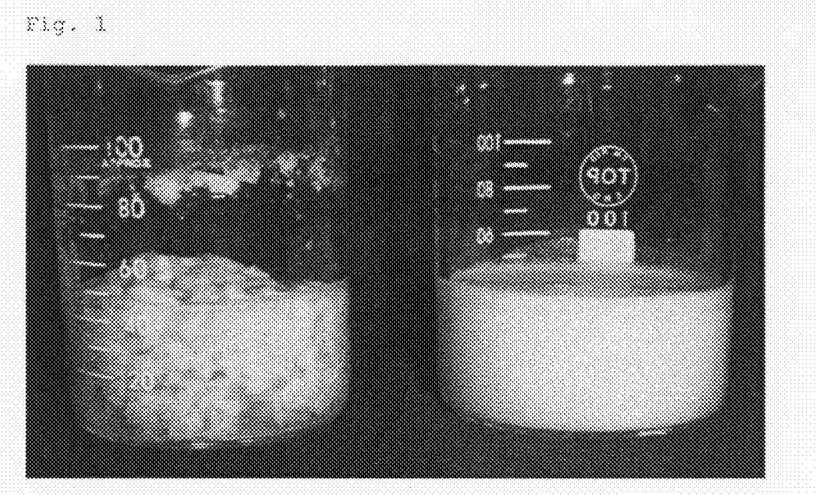
FIG. 1 (left side) is a photograph showing a product obtained by adding 10 g of commercially available active gluten (F-marked wheat protein manufactured by Hokkoku Food Co., Ltd.) to 10 g of water, followed by stirring, and (right side) is a photograph showing a product obtained by adding 10 g of the same active gluten to 40 g of an aqueous solution of 0.25% water-soluble soybean polysaccharides, followed by stirring.
Figure 2:
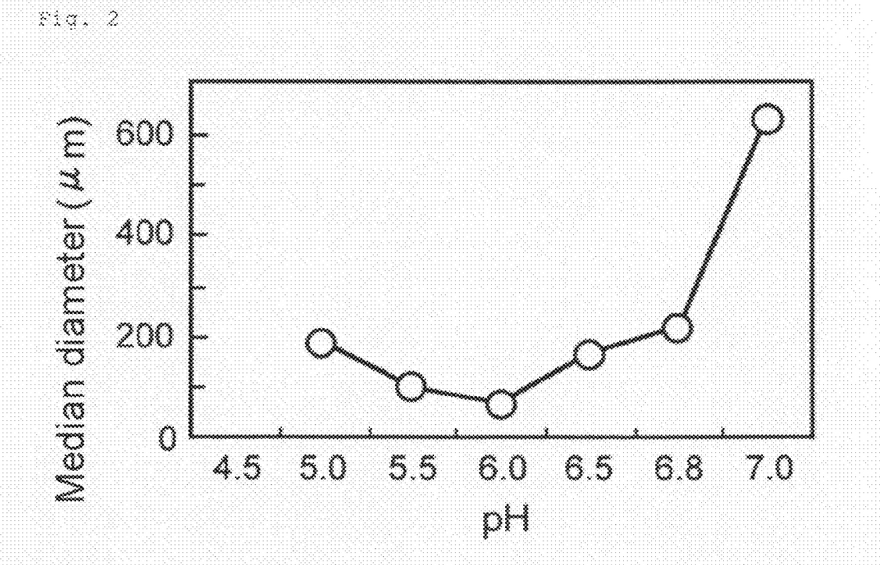
FIG. 2 is a graph showing a relationship between the dispersibility of gluten using water-soluble soybean polysaccharide and the pH.

The results were shown in FIG. 2. Even in the pH range where active gluten was generally aggregated and not dispersed, active gluten was dispersed, and was well dispersed at the pH 5.5, pH 6.0 and pH 6.5. The particle diameter was also small at the pH of 5.0 to 6.8.

Example 7

Fish Sausage

To 2,000 g of walleye pollack paste, a dispersion solution prepared by dispersing 44 g of salt, 220 g of lard, 60 g of sugar, 30 g of seasoning agent, 140 g of corn starch and 40 g of active gluten obtained in Example 1 in 880 g of cold water was added, followed by mixing with a silent cutter to obtain a fish paste. Next, a casing was filled with the fish paste, followed by sealing and further boiling at 95° C. for 20 minutes. After cooling in cold water and storage overnight in a refrigerator, sensory evaluation was carried out.

Comparative Example 5

Active gluten obtained in Comparative Example 1 could not be dispersed in water and therefore added directly in powder form. Fish sausage was obtained under the same conditions as in Example 7 except for the above points.

Comparative Example 6

Active gluten obtained in Comparative Example 2 could not be dispersed in water and therefore added directly in a powder form. Fish sausage was obtained under the same conditions as in Example 7 except for the above points.

(Control Group 4)

Active gluten obtained in Control Group 1 could not be dispersed in water and therefore added directly in a powder form. Fish sausage was obtained under the same conditions in Example 7 except for the above points.

(Control Group 5)

Fish sausage was obtained under the same conditions as in Example 7, except that active gluten was not used and the amount of cold water added was changed to 800 g.

(Method for Sensory Evaluation)

With respect to texture (elasticity) and flavor of fish sausages of Example 7, Comparative Examples 5 and 6, and Control Groups 4 and 5, sensory evaluation was carried out by 7 panelists. Five-rank evaluation was carried out using Control Group 5 as standard. As the numerical value increased, texture of sausages became better. The results were shown in Table 5.

TABLE 5

Effect on fish sausage

| | Example 7 | Comparative Example 5 | Comparative Example 6 | Control Group 4 | Control Group 5 |
|---|---|---|---|---|---|
| | | Active gluten | | | |
| | Example 1 Water-soluble soybean polysaccharide | Comparative Example 1 Acetic acid | Comparative Example 2 Ammonia | Control Group 1 | — |
| Texture (Elasticity) | 4.5 | 3 | 4.5 | 5 | 1 |
| Flavor | 5 | 3.5 | 1 | 5 | 5 |

In Example 7, fish sausage mixed with active gluten containing a water-soluble soybean polysaccharide showed elasticity which was nearly the same as that of Control Group 4, and showed good texture. With respect to flavor, fish sausages of Comparative Examples 5 and 6 had peculiar foreign odor and showed sense of incongruity, while sausage of Example 7 had no foreign odor similarly to Control Groups 4 and 5, and showed good flavor. Since active gluten containing a water-soluble soybean polysaccharide of Example 7 could be added to a fish paste after dispersing in cold water, the powder did not scatter, and therefore machine parts and the floor of the workspace were not stained, while there was a sanitary problem because of severe dusting in Comparative Examples 5 and 6, and Control Group 4.

Example 8

Sausage

To 1,000 g of minced pork (arm), a dispersion solution prepared by dispersing 20 g of salt, 0.15 g of sodium nitrite preparation, 5 g of phosphate, 200 g of lard, 12 g of sugar, 12 g of seasoning agent and 34 g of active gluten obtained in Example 1 in 400 g of ice water was added, followed by mixing with a food processor to obtain a paste dough. Next, a casing was filled with the paste dough, followed by sealing and further storage and further heating at 78° C. for 50 minutes. After cooling in cold water and storage overnight in a refrigerator, sensory evaluation was carried out.

Comparative Example 7

Active gluten obtained in Comparative Example 1 could not be dispersed in water and therefore added directly in a powder form. Sausage was obtained under the same conditions as in Example 8 except for the above points.

Comparative Example 8

Active gluten obtained in Comparative Example 2 could not be dispersed in water and therefore added directly in a powder form. Sausage was obtained under the same conditions as in Example 8 except for the above points.

(Control Group 6)

Active gluten obtained in Control Group 1 could not be dispersed in water and therefore added directly in powder form. Sausage was obtained under the same conditions as in Example 8 except for the above points.

(Control Group 7)

Sausage was obtained under the same conditions as in Example 8, except that active gluten was not used and the amount of pork was changed to 1,100 g, and the amount of ice water was changed to 340 g.

(Method for Sensory Evaluation)

With respect to texture (elasticity) and flavor of sausages of Example 8, Comparative Examples 7 and 8, and Control Groups 6 and 7, sensory evaluation was carried out by 7 panelists. Five-rank evaluation was carried out using Control Group 7 as standard. As the numerical value increased, texture of sausages became better. The results were shown in Table 6.

TABLE 6

Effect on sausage

| | Example 8 | Comparative Example 7 | Comparative Example 8 | Control Group 6 | Control Group 7 |
|---|---|---|---|---|---|
| | | Active gluten | | | |
| | Example 1 Water-soluble soybean polysaccharide | Comparative Example 1 Acetic acid | Comparative Example 2 Ammonia | Control Group 1 | — |
| Texture (Elasticity) | 4.5 | 2 | 4.5 | 5 | 5 |
| Flavor | 5 | 3 | 1 | 5 | 5 |

In Example 8, sausage mixed with active gluten containing a water-soluble soybean polysaccharide showed elasticity which was nearly the same as that of Control Group 6, and showed good texture. With respect to flavor, sausages of Comparative Examples 7 and 8 had peculiar foreign odor and showed sense of incongruity, while sausage of Example 8 had no foreign odor similarly to Control Groups 6 and 7, and showed good flavor. Since active gluten containing the water-soluble soybean polysaccharide of Example 8 could be added to a paste after dispersing in cold water, the powder did not scatter, and therefore machine parts and the floor of the workspace were not stained, while there was a sanitary problem because of severe dusting in Comparative Examples 7 and 8, and Control Group 6.

Test Example 2

With respect to a water-soluble soybean polysaccharide ("SOYAFIVE-S" manufactured by Fuji Oil Co., Ltd., average molecular weight: 550,000, content of galacturonic acid: 18.2% by weight) among galacturonic acid-containing water-soluble polysaccharides, the effect of improving dispersibility of gluten was examined. To distilled water at 20° C., the water-soluble soybean polysaccharide was added so as to adjust to the concentration shown in Table 7, followed by stirring to obtain a solution. To the solution, commercially available active gluten (solid content, 95.5% by weight) was added so as to adjust the concentration to 15, 20 or 25% by weight while stirring (500 rpm) with Three-One Motor (Shinto Scientific Co., Ltd.), and then dispersibility of gluten was evaluated. Regarding the method for measuring viscosity of the dispersion solution, immediately after uniformly dispersing gluten in the water-soluble soybean polysaccharide solution, viscosity at 25° C. was measured by a rotational viscometer (manufactured by TOKIMEC Co.). The results were shown in Table 7. Dispersibility was evaluated by criteria shown in Table 2. The additive amount of each additive was expressed by % by weight based on gluten.

TABLE 7

Physical properties of gluten dispersion solution having each concentration

| | | Test No. | | | | | | |
|---|---|---|---|---|---|---|---|---|
| | | 1 | 2 | 3 | 4 | 5 | 6 | 7 |
| Concentration of a water-soluble soybean polysaccharide | | 0.05 | 0.1 | 0.5 | 1.0 | 5.0 | 10.0 | 20.0 |
| Concentration of active gluten (15% by weight) | Dispersibility | 2 | 4 | 4 | 4 | 4 | 4 | 4 |
| | Viscosity (mPa·s) | — | 30.8 | 22.2 | 9.2 | 10.1 | 29.4 | 58.0 |
| Concentration of active gluten (20% by weight) | Dispersibility | 1 | 2 | 4 | 4 | 4 | 3 | 1 |
| | Viscosity (mPa·s) | — | — | 48.3 | 55.8 | 116.5 | 229 | — |
| Concentration of active gluten (25% by weight) | Dispersibility | 1 | 1 | 1 | 4 | 3 | 1 | 1 |
| | Viscosity (mPa·s) | — | — | — | 308 | 318 | — | — |

From the results shown in Table 7, good dispersibility could be obtained by adjusting the additive amount of the water-soluble soybean polysaccharide according to the concentration of active gluten. In other words, in case that the concentration of active gluten was 15% by weight, gluten could be well dispersed when the concentration of the water-soluble soybean polysaccharide was within a range from 0.1 to 20% by weight based on gluten. Similarly, in case that the concentration of active gluten was 20% by weight, gluten could be well dispersed when the concentration of the water-soluble soybean polysaccharide was within a range from 0.5 to 10% by weight based on gluten, and in case that the concentration of active gluten was 25% by weight, gluten could be well dispersed when the concentration of the water-soluble soybean polysaccharide was within a range from 1 to 5% by weight based on gluten.

Example 9

Into distilled water, 1.2 g of water-soluble soybean polysaccharide was dissolved to prepare 240 g of a solution. While stirring the solution with Three-One Motor, 60 g of commercially available active gluten was uniformly dispersed in the solution to obtain a dispersion solution (pH 6.0). The pH of the solution was adjusted to 6.5 using sodium hydroxide. Next, 0.12 g of protease ("protease N" manufactured by Amano Enzyme Inc.) was added and the reaction solution was reacted at 38° C. for 0 to 60 minutes while gently stirring, and then the enzyme was deactivated by maintaining in a boiling bath for 15 minutes. After cooling of the solution to room temperature, centrifugal separation at 5,000 g for 20 minutes was carried out, and a supernatant was obtained. The protein concentrations of hydrolyzed gluten and active gluten were measured by a Kjeldahl method. The yield of a gluten hydrolysate was determined as a ratio of the protein amount in the supernatant after degradation to the total protein amount before degradation. The results were shown in FIG. 3.

Comparative Example 9

Hydrolysate was obtained under the same conditions as in Example 9, except that the water-soluble soybean polysaccharide was not used.

Figure 3:
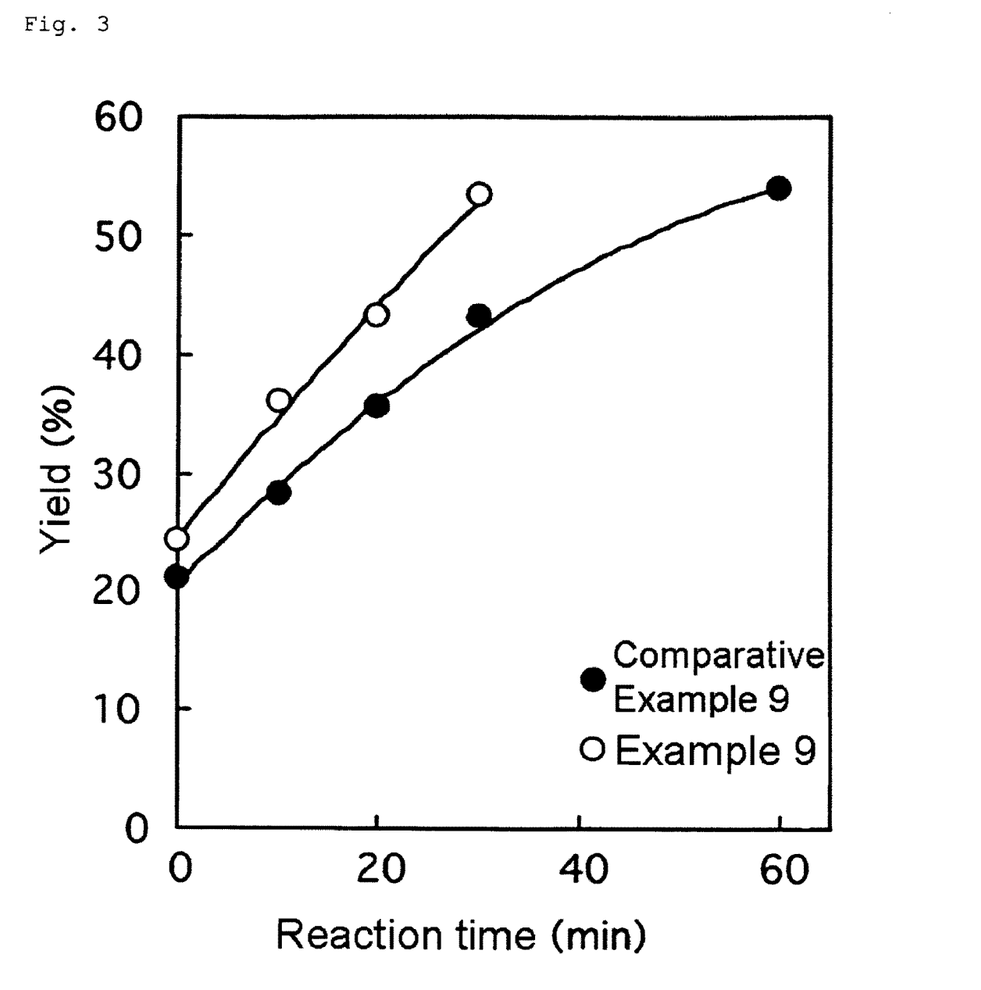
FIG. 3 is a graph showing the yield of hydrolysates of Example 9 and Comparative Example 9.

From the results shown in FIG. 3, in order to allow the yield of the degradation product in the supernatant in the reaction solution to reach about 55%, 60 minutes (two times) was required in Comparative Example 9, whereas, 30 minutes (about half time) was required in Example 9. In other words, the use of the water-soluble soybean polysaccharide enabled to promote the hydrolysis reaction and to shorten reaction time. It could be said that the use of the water-soluble soybean polysaccharide enabled good dispersion of gluten to prepare a uniformly slurry dispersion solution having low viscosity since gluten substrate and an enzyme uniformly reacted. In contrast, in Comparative Example 9, gluten in the dispersion solution was not dispersed to form a gum-like lump and therefore the uniform action of the enzyme on gluten substrate was prevented because of steric hindrance, and thus it was considered that the reaction did not easily proceed. Even if 30 minutes elapsed after initiation of the reaction, the gum-like lump did not disappear. When the enzymatic hydrolysis reaction quickly proceeds and the reaction time is shortened, it is possible to obtain the effect capable of reducing the production cost and increasing yield and production efficiency. Also, a risk such as putrefaction during the reaction can be reduced and, as a result, the effect of suppressing deterioration of flavor of the hydrolysate can be expected.

The invention claimed is:

1. A method for dispersing gluten into an aqueous medium, comprising mixing gluten with a galacturonic acid-containing water-soluble polysaccharide,
   wherein the galacturonic acid-containing water-soluble polysaccharide is a water-soluble soybean polysaccharide.

2. A gluten dispersion solution, comprising a galacturonic acid-containing water-soluble polysaccharide,
   wherein the galacturonic acid-containing water-soluble polysaccharide is a water-soluble soybean polysaccharide and the concentration of gluten in the dispersion solution is 25% by weight or less.

3. A method for producing active gluten, comprising mixing a galacturonic acid-containing water-soluble polysaccharide, gluten and an aqueous medium to prepare a gluten dispersion solution and then drying the mixture,
wherein the galacturonic acid-containing water-soluble polysaccharide is a water-soluble soybean polysaccharide and the concentration of gluten in the dispersion solution is 25% by weight or less.

4. The A method for producing a gluten hydrolysate, comprising mixing a galacturonic acid-containing water-soluble polysaccharide, gluten and an aqueous medium to prepare a gluten dispersion solution, and hydrolyzing gluten,
wherein the galacturonic acid-containing water-soluble polysaccharide is a water-soluble soybean polysaccharide and the concentration of gluten in the dispersion solution is 25% by weight or less.

* * * * *